United States Patent
Kulkarni et al.

(10) Patent No.: US 10,824,526 B2
(45) Date of Patent: Nov. 3, 2020

(54) USING FAILED STORAGE DEVICE IN PEER-TO-PEER STORAGE SYSTEM TO PERFORM STORAGE-CENTRIC TASK

(71) Applicant: Western Digital Technologies, Inc., San Jose, CA (US)

(72) Inventors: Anand Kulkarni, San Jose, CA (US); Vladislav Bolkhovitin, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 113 days.

(21) Appl. No.: 16/054,892

(22) Filed: Aug. 3, 2018

(65) Prior Publication Data

US 2020/0042412 A1 Feb. 6, 2020

(51) Int. Cl.
| | |
|---|---|
| *G06F 11/00* | (2006.01) |
| *G06F 11/20* | (2006.01) |
| *H04L 29/08* | (2006.01) |
| *G06F 11/07* | (2006.01) |
| *G06F 11/14* | (2006.01) |

(52) U.S. Cl.
CPC ...... *G06F 11/2094* (2013.01); *G06F 11/0727* (2013.01); *G06F 11/1464* (2013.01); *H04L 67/1034* (2013.01); *H04L 67/1044* (2013.01); *H04L 67/1074* (2013.01); *H04L 67/1093* (2013.01); *H04L 67/1097* (2013.01)

(58) Field of Classification Search
CPC .......... G06F 11/2094; G06F 11/0727; G06F 11/1464
See application file for complete search history.

(56) References Cited

U.S. PATENT DOCUMENTS

| | | |
|---|---|---|
| 5,388,083 A | 2/1995 | Assar et al. |
| 5,530,948 A | 6/1996 | Islam |
| 5,680,539 A | 10/1997 | Jones |
| 5,742,752 A | 4/1998 | DeKoning |
| 6,092,215 A | 7/2000 | Hodges et al. |
| 6,738,937 B1 | 5/2004 | Bergsten |
| 7,293,133 B1 | 11/2007 | Colgrove et al. |

(Continued)

FOREIGN PATENT DOCUMENTS

| | | |
|---|---|---|
| EP | 2626780 B1 | 11/2019 |
| WO | 2014110095 A1 | 7/2014 |
| WO | 2015116197 A1 | 8/2015 |

OTHER PUBLICATIONS

Bates, S., "Donard: NVM Express for Peer-2-Peer between SSDs and other PCIe Devices," Storage Developer Conference, SNIA Santa Clara, 2015, 18 pages.

(Continued)

*Primary Examiner* — Charles Ehne
(74) *Attorney, Agent, or Firm* — Patent Law Works LLP

(57) ABSTRACT

Methods, systems, and other aspects for using a failed storage device in a peer-to-peer (P2P) storage system to perform a storage-centric task. For example, a method may include, responsive to a detection of a failed storage device in a P2P storage system, determining, by the failed storage device, that a storage-centric task is assigned to the failed storage device; and performing, by the failed storage device, the storage-centric task responsive to P2P communications with a functioning storage device in the P2P storage system.

20 Claims, 9 Drawing Sheets

(56) References Cited

U.S. PATENT DOCUMENTS

| | | | |
|---|---|---|---|
| 7,434,107 B2 | 10/2008 | Marks | |
| 7,454,655 B2 | 11/2008 | Werner et al. | |
| 7,571,344 B2 | 8/2009 | Hughes et al. | |
| 7,596,570 B1 | 9/2009 | Emigh et al. | |
| 7,620,841 B2 | 11/2009 | Chen et al. | |
| 7,680,837 B2 | 3/2010 | Yamato | |
| 7,783,600 B1* | 8/2010 | Spertus | G06F 11/10 707/622 |
| 7,934,055 B2 | 4/2011 | Flynn et al. | |
| 7,984,328 B1 | 7/2011 | Coatney | |
| 8,086,911 B1 | 12/2011 | Taylor | |
| 8,289,641 B1 | 10/2012 | Emami | |
| 8,473,648 B2 | 6/2013 | Chakhaiyar et al. | |
| 8,583,853 B1 | 11/2013 | Lee et al. | |
| 8,838,931 B1 | 9/2014 | Marshak et al. | |
| 8,904,261 B2 | 12/2014 | Cideciyan et al. | |
| 9,116,624 B2 | 8/2015 | Canepa et al. | |
| 9,118,698 B1 | 8/2015 | Radovanovic | |
| 9,122,587 B2 | 9/2015 | Baryudin et al. | |
| 9,262,278 B2 | 2/2016 | Ben Romdhane et al. | |
| 9,448,924 B2 | 3/2016 | Sundaram et al. | |
| 9,417,821 B2 | 8/2016 | Slaight et al. | |
| 9,720,601 B2 | 8/2017 | Gupta et al. | |
| 9,785,480 B2 | 10/2017 | Kamawat et al. | |
| 9,894,141 B2 | 2/2018 | Hesselink et al. | |
| 9,971,515 B2 | 5/2018 | Chang et al. | |
| 10,042,721 B2 | 8/2018 | Condict et al. | |
| 10,241,722 B1 | 3/2019 | Malwankar et al. | |
| 10,289,507 B1 | 5/2019 | Malwankar et al. | |
| 10,379,948 B2 | 8/2019 | O'Krafka et al. | |
| 10,394,634 B2 | 8/2019 | Chagam Reddy | |
| 10,409,769 B1* | 9/2019 | Malhotra | G06F 3/06 |
| 10,474,528 B2 | 11/2019 | Bolkhovitin et al. | |
| 2002/0162075 A1 | 10/2002 | Talagala et al. | |
| 2003/0135514 A1 | 7/2003 | Patel et al. | |
| 2005/0028048 A1 | 2/2005 | New et al. | |
| 2005/0080991 A1 | 4/2005 | Keohane et al. | |
| 2005/0114448 A1 | 5/2005 | Skomra | |
| 2005/0114726 A1 | 5/2005 | Ouchi | |
| 2006/0031722 A1 | 2/2006 | Kolvick et al. | |
| 2006/0123142 A1 | 6/2006 | Duncan et al. | |
| 2007/0226413 A1 | 9/2007 | Elliott et al. | |
| 2007/0245082 A1 | 10/2007 | Margolus et al. | |
| 2008/0005382 A1 | 1/2008 | Mimatsu | |
| 2008/0034153 A1 | 2/2008 | Lee et al. | |
| 2008/0250057 A1 | 10/2008 | Rothstein et al. | |
| 2009/0070539 A1 | 3/2009 | Haustein et al. | |
| 2009/0132760 A1 | 5/2009 | Flynn et al. | |
| 2009/0150605 A1 | 6/2009 | Flynn et al. | |
| 2009/0307426 A1 | 12/2009 | Galloway et al. | |
| 2010/0251073 A1 | 9/2010 | Stolowitz | |
| 2010/0280998 A1 | 11/2010 | Goebel et al. | |
| 2011/0029711 A1 | 2/2011 | Dhuse et al. | |
| 2011/0055178 A1 | 3/2011 | Mark | |
| 2011/0093742 A1 | 4/2011 | Shinozaki | |
| 2012/0011200 A1* | 1/2012 | Zhang | H04L 67/1097 709/204 |
| 2012/0079317 A1 | 3/2012 | Nelogal et al. | |
| 2012/0179869 A1 | 7/2012 | Flynn et al. | |
| 2012/0284460 A1 | 11/2012 | Guda | |
| 2013/0073894 A1 | 3/2013 | Xavier et al. | |
| 2013/0179753 A1 | 7/2013 | Flynn et al. | |
| 2013/0339599 A1 | 12/2013 | Sundrani | |
| 2014/0012906 A1 | 1/2014 | Teja et al. | |
| 2014/0101369 A1 | 4/2014 | Tomlin et al. | |
| 2014/0181041 A1 | 6/2014 | Whitehead et al. | |
| 2014/0181575 A1 | 6/2014 | Kalach et al. | |
| 2014/0237298 A1 | 8/2014 | Pe'er | |
| 2014/0258598 A1 | 9/2014 | Canepa et al. | |
| 2014/0365719 A1 | 12/2014 | Kuzmin et al. | |
| 2014/0379671 A1 | 12/2014 | Barrus et al. | |
| 2015/0067244 A1 | 3/2015 | Kruger | |
| 2015/0205668 A1 | 7/2015 | Sundaram et al. | |
| 2016/0070652 A1 | 3/2016 | Sundararaman et al. | |
| 2016/0092309 A1 | 3/2016 | Gao et al. | |
| 2016/0234172 A1 | 8/2016 | Agarwal et al. | |
| 2016/0335208 A1 | 11/2016 | Slaight et al. | |
| 2016/0342476 A1 | 11/2016 | Nazari et al. | |
| 2017/0116074 A1 | 4/2017 | Hayes et al. | |
| 2017/0242744 A1 | 8/2017 | Wang et al. | |
| 2017/0269862 A1 | 9/2017 | Agombar et al. | |
| 2017/0270018 A1 | 9/2017 | Xiao et al. | |
| 2017/0286237 A1 | 10/2017 | Condict et al. | |
| 2017/0329542 A1 | 11/2017 | Chou et al. | |
| 2018/0018231 A1 | 1/2018 | Okada et al. | |
| 2018/0024964 A1 | 1/2018 | Mao et al. | |
| 2018/0032446 A1 | 2/2018 | Amarendran et al. | |
| 2018/0054217 A1 | 2/2018 | Schwaderer | |
| 2018/0101450 A1 | 4/2018 | Park et al. | |
| 2018/0137004 A1 | 5/2018 | Gao et al. | |
| 2018/0341548 A1 | 11/2018 | Bolkhovitin et al. | |
| 2018/0341606 A1 | 11/2018 | Bolkhovitin et al. | |
| 2018/0357019 A1 | 12/2018 | Karr et al. | |
| 2019/0102249 A1 | 4/2019 | Bolkhovitin et al. | |
| 2019/0102250 A1 | 4/2019 | O'Krafka et al. | |
| 2019/0243703 A1 | 8/2019 | Rooney et al. | |

OTHER PUBLICATIONS

Chester, E., "Drobo creator announces Transporter, the private cloud storage solution," May 28, 2013, <https://www.bit-tech.net/news/transporter-private-cloud-storage-drobo-cre/1/>, 2 pages.

Hasan, R., et al., "A Survey of Peer-to-Peer Storage Techniques for Distributed File Systems," ITCC '05 Proceedings of the International Conference on Information Technology: Coding and Computing (ITCC'05)—vol. 2 Apr. 4, 2005, 9 pages.

Wikipedia, The Free Encyclopedia, "Key Code Qualifier," retrieved Jul. 10, 2018, <https://en.wikipedia.org/wiki/Key_Code_Qualifier>, 8 pages.

"SCSI Sense Key Error Guide," Sun Microsystems, Inc., Part No. 817-5918-10, Feb. 2004, Revision A, 16 pages.

International Search Report and Written Opinion of Internationals Application No. PCT/US2019/035085, dated Sep. 18, 2019, 8 pages.

International Search Report and Written Opinion of Internationals Application No. PCT/US2019/035087, dated Sep. 25, 2019, 11 pages.

International Search Report and Written Opinion of Internationals Application No. PCT/US2019/035088, dated Sep. 26, 2019, 10 pages.

Ahluwalia, G., United States, White Paper. Event Stream Processor as seen by SAP, An evolution of event driven architecture, pp. 1-11.

Bulk Delete. OpenStack Docs: OpenStack Security Guide, docs.openstack.org/ocata/user-guide/cli-swift-bulk-delete.html.

Using Oracle Cloud Infrastructure Object Storage Classic, Deleting Multiple Objects in a Single Operation, Mar. 28, 2018, https://docs.oracle.com/en/cloud/iaas/storage-cloud/cssto/deleting-multiple-objects-single-operation.html.

About the IBM Cloud Storage API. Sep. 28, 2018. https://console.bluemix.net/docs/services/cloud-object-storage/api-reference/about-api.html#about-the-ibm-cloud-object-storage-api.

Hightower, R., et al., Analytics with Apache Spark Tutorial Part 2: Spark SQL—DZone Big Data, Dzone.com, Nov. 3, 2015, dzone.com/articles/analytics-with-apache-spark-tutorial-part-2-spark.

Moatti, Yosef & Rom, et al., 2017, Too Big to Eat: Boosting Analytics Data Ingestion from Object Stores with Scoop, https://www.researchgate.net/.

Object Operations. Sep. 28, 2018, https://console.bluemix.net/docs/services/cloud-object-storage/api-reference/api-reference-objects.html#object-operations.

Zhang, Jiacheng, et al., ParaFS: A Log-Structured File System to Exploit the Internal Parallelism of Flahs Devices, USENIX Annual Technical Conference, Jun. 22-24, 2016, 15 pages.

International Search Report and Written Opinion of Internationals Application No. PCT/US2019/035060, dated Sep. 16, 2019, 8 pages.

Amvrosiadis et al., Practical Scrubbing: Getting to the bad sector at the right time, 2012, IEEE, pp. 1-12. (Year: 2012).

(56) References Cited

OTHER PUBLICATIONS

International Search Report and Written Opinion of Application No. PCT/US2019/035060, dated Sep. 16, 2019, 3 pages.
International Search Report and Written Opinion of Application No. PCT/US2019/063104, dated Jan. 23, 2020, 11 pages.
IP.com, Peer-to-Peer Hard Disk Drive, Apr. 24, 2006, IP.com, pp. 1-3. (Year: 2006).
Xiang, Liping, et al., Optimal Recovery of Single Disk Failure in RDP Code Storage Systems, Jun. 18, 2010, http://citeseerx.ist.psu.edu/viewdoc/download?doi=10.1.1.331.4168&rep=rep1&type=pdf.
International Search Report and Written Opinion of Internationals Application No. PCT/US2018/062498, dated Mar. 12, 2019, 20 pages.

\* cited by examiner

USING FAILED STORAGE DEVICE IN PEER-TO-PEER STORAGE SYSTEM TO PERFORM STORAGE-CENTRIC TASK

BACKGROUND

The present disclosure relates to storage systems. In a more particular example, the present disclosure relates to methods and systems for using a failed storage device in a peer-to-peer (P2P) storage system to perform a storage-centric task.

Storage systems with a plurality of storage devices typically employ data redundancy techniques (e.g., redundant array of independent disks (RAID) mirroring or parity, erasure coding) to enable reconstructing data and rebuilding of a failed storage device. For example, when a storage device in a RAID array has failed, in conventional systems the failed storage device is no longer used and the remaining functioning storage devices are used to reconstruct the lost data of the failed storage device.

During this time, the storage system enters a degraded mode of operation in which the storage system may experience a reduced level of performance and/or load balancing issues (e.g., due to an increased load imposed on the remaining functioning storage devices) until the failed storage device is repaired or replaced.

SUMMARY

The present disclosure relates to methods and systems for using a failed storage device in a P2P storage system to perform a storage-centric task.

One or more embodiments of the present disclosure as disclosed herein may provide a number of technical features and advantages, including but not limited to the following:

(1) Improved system performance in the event of a failure of a storage device in the storage system. The present disclosure improves system performance by assigning storage-centric tasks to, rather than away from (per conventional systems), the failed storage device upon detecting the failure. The failed storage device can perform tasks more efficiently than another, still functioning storage device in the storage system because the failed storage device no longer has a regular input/output (I/O) load (e.g., compression/decompression or encryption/decryption, which are very computation intensive) due to the failure of its storage medium.

(2) Improved system resource utilization in the event of a failure of a storage device in the storage system. The present disclosure improves system resource utilization through the continued use of the failed storage device after the device's failure by employing the otherwise idle compute resources of the failed storage device to perform storage-centric tasks. The present disclosure takes advantage of the fact that despite a failure in its storage medium, other compute, storage, and/or I/O resources of the failed storage device may remain operational.

The present disclosure includes, but is not limited to, the following aspects:

According to one innovative aspect, a method including responsive to a detection of a failed storage device in a peer-to-peer (P2P) storage system, determining, by the failed storage device, that a storage-centric task is assigned to the failed storage device; and performing, by the failed storage device, the storage-centric task responsive to P2P communications with a functioning storage device in the P2P storage system.

According to another innovative aspect, an apparatus including one or more processors; and logic, executable by the one or more processors, configured to perform operations comprising: responsive to a detection of a failed storage device in a peer-to-peer (P2P) storage system: determining, by the failed storage device, that a storage-centric task is assigned to the failed storage device; and performing, by the failed storage device, the storage-centric task responsive to P2P communications with a functioning storage device in the P2P storage system.

According to yet another innovative aspect, a computer-implemented method comprising detecting a failed storage device in a peer-to-peer (P2P) storage system; responsive to the detecting the failed storage device, assigning a storage-centric task to the failed storage device, the storage-centric task to be performed by the failed storage device responsive to P2P communications with a functioning storage device in the P2P storage system; and detecting a completion of the storage-centric task by the failed storage device.

According to a further innovative aspect, a system comprising means for detecting a failed storage device in a plurality of storage devices; means for assigning a storage-centric task to the failed storage device in response to detecting the failed storage device; and means for performing the storage-centric task responsive to peer-to-peer (P2P) communications with a functioning storage device in the plurality of storage devices.

These and other implementations may each optionally include one or more of the following features: that the performing the storage-centric task includes receiving input data associated with the storage-centric task via the P2P communications from the functioning storage device and performing the storage-centric task using the input data received from the functioning storage device; that the performing the storage-centric task includes generating output data and sending the output data via the P2P communications to the functioning storage device; that a functioning compute resource in the failed storage device performs the storage-centric task; that the P2P communications include at least one of a P2P read command and a P2P write command that are issued by the failed storage device to the functioning storage device; that the P2P storage system includes a controller, and the controller assigns the storage-centric task to the failed storage device based on a load balancing policy for the P2P storage system; that the detection of the failed storage device causes a change in a weighting of the load balancing policy; and that the storage-centric task comprises a pattern matching task, and the failed storage device performs the pattern matching task on a dataset stored on the functioning storage device.

Other implementations of one or more of these aspects include corresponding systems, apparatus, and computer programs, configured to perform the actions of the methods, encoded on computer storage devices. It should be understood that language used in the present disclosure has been principally selected for readability and instructional purposes, and not to limit the scope of the subject matter disclosed herein.

BRIEF DESCRIPTION OF THE DRAWINGS

The techniques introduced herein are illustrated by way of example, and not by way of limitation, in the figures of the accompanying drawings in which like reference numerals are used to refer to similar elements.

DETAILED DESCRIPTION

Novel data processing technology, such as but not limited to systems, devices, and methods for using a failed storage device in a peer-to-peer (P2P) storage system to perform a storage-centric task are disclosed. While this technology is described below in the context of a particular system architecture in various cases, it should be understood that the systems and methods can be applied to other architectures and organizations of hardware. More specifically, it should be noted that while the following description is made with reference to certain embodiments, the present disclosure may apply to any storage system that implements data redundancy known or contemplated.

Figure 1:
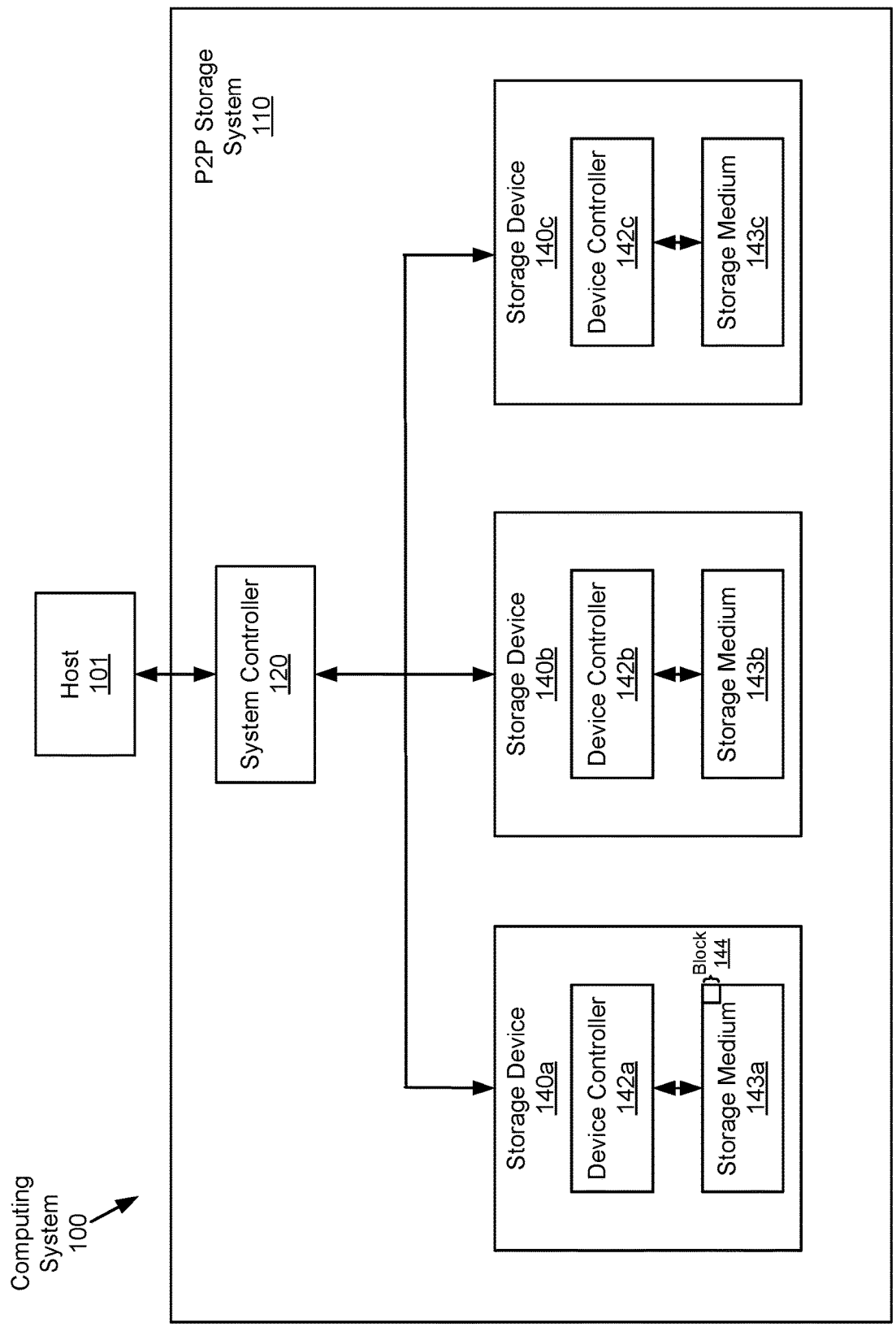
FIG. 1 depicts a block diagram of an example computing system including a host and a peer-to-peer (P2P) storage system, in accordance with an embodiment.

FIG. 1 depicts a block diagram of an example computing system 100 including a host 101 and a P2P storage system 110, in accordance with an embodiment. As described in detail below with reference to FIGS. 5-6, the computing system 100 may be used in connection with a method for using a failed storage device in a P2P storage system to perform a storage-centric task.

In the present disclosure, a "storage-centric task" may refer to any sequence of operations (e.g., a "job", a "process", etc.) that involve the transfer and/or processing of data stored in storage devices or systems. Examples of storage-centric tasks include pattern matching, map/reduce, compression/decompression, encryption/decryption, failed storage device rebuild, etc.

The host 101 may be one or more of any suitable computer devices or systems, such as a server computer, a desktop computer, a laptop computer, a tablet computer, a mobile telephone, or any other electronic device capable of making requests to the P2P storage system. In some embodiments, the host 101 may include one or more processors, one or more memory devices, and any other suitable components to add functionality to the host 101.

The host 101 may be communicatively coupled to the P2P storage system 110 through a network, such as a local-area network (LAN), wide-area network (WAN), switched fabric, wired or wireless network, private or public network, etc.

The host 101 may execute one or more applications that make storage requests (e.g., read, write, etc.) to the P2P storage system. In some embodiments, the one or more applications may be dedicated software applications running on the host 101 or may alternatively reside on other suitable computing devices and may be remotely executed by the host 101.

The P2P storage system 110 may comprise a system controller 120 and a plurality of storage devices 140a, 140b, and 140c coupled through a transport medium, such as an internal fabric based on Ethernet, InfiniBand, Peripheral Component Interconnect Express (PCIe), Non-Volatile Memory Express Over Fabric (NVMeOF), etc. Although the P2P storage system 110 is shown in FIG. 1 with three storage devices for ease of illustration, it should be noted that other embodiments of the P2P storage system may employ any suitable quantity of storage devices.

As described in more detail with reference to FIG. 2 below, the system controller 120 may comprise one or more computing devices and/or software (collectively referred to as "logic" in the present disclosure) configured to manage the operation of and provide an external interface to (e.g., for communication with the host 101) the storage devices 140a, 140b, and 140c. For example, the system controller 120 may coordinate and perform various operations of the storage devices 140a, 140b, and 140c including data redundancy and/or recovery, storage device rebuild, and/or garbage collection. In addition, in some embodiments the system controller 120 may coordinate communications between the host 101 and the storage devices 140a, 140b, and 140c, including forwarding read or write requests received from the host 101 to the corresponding storage device (including performing any necessary address translation as described further below), and retrieving data from the storage devices in a logical manner (e.g., blocks may be assembled into a stripe) before being returned to the host 101. In some embodiments, the system controller 120 may be a Non-Volatile Memory Express (NVMe) controller.

In some embodiments, the system controller 120 may coordinate its actions with the actions of the other components in the computer system 100, such as the host 101 and/or the storage devices 140a, 140b, and 140c, in performing the various storage-centric tasks as described below, using, for example, the distributed global FTL data management scheme as described below with reference to FIG. 7. In some embodiments, the system controller 120 may not be a separate component as shown in FIG. 1 but instead may be integrated into the host 101 or in one or more of the storage devices 140a, 140b, and 140c.

Each of the plurality of storage devices 140a, 140b, and 140c (henceforth to be generally referred to individually as storage device 140) may be a volatile or non-volatile non-transitory memory device with suitable characteristics, such as flash memory (e.g., solid-state drive (SSD)), persistent memory (PM), and/or hard disk media including shingled magnetic recording (SMR) disks, hybrid storage devices, etc. The storage devices 140a, 140b, and 140c may be communicatively coupled to each other and to the system controller 120 through a transport medium, such as an internal fabric based on Ethernet, InfiniBand, PCIe, NVMeOF, etc.

Each storage device 140 includes a device controller 142 and a storage medium 143. As described in more detail with reference to FIG. 3 below, the device controller 142 may comprise one or more computing devices and/or software (collectively referred to as "logic" in the present disclosure) configured to manage the operation of the storage medium 143 and provide an external interface to the respective storage device 140. In some embodiments, as described below with reference to FIG. 4, these operations may include performing peer-to-peer (P2P) communications (e.g., P2P data transfers) with other storage devices in the P2P storage system.

The storage medium 143 may comprise one or more volatile or non-volatile memory media having physical or logical portions for storing data, such as dies, disks, memory cells, sectors, and/or pages. In some embodiments, data may be organized in the storage medium 143 of each storage device 140 in the form of one or more blocks 144. Further, the blocks 144 may be written to the storage devices in the P2P storage system 110 in the form of stripes using a suitable data structuring methodology such as log-structuring.

The P2P storage system 110 may be configured using a suitable redundancy scheme such as RAID or erasure coding such that in the event of a failure of one or more storage devices in the P2P storage system 110, a data reconstruction and/or rebuild process may be performed to recover the data from the failed storage device(s).

In the present disclosure, a "failed storage device" may refer to any storage device in the P2P storage system that is not properly functioning in any respect, including: (1) a storage device that is still operational but may be deemed "failed" based on an early warning indication and (2) a storage device that has only partially failed. For example, in some embodiments the failed storage device may include one or more storage resources (e.g., storage medium 143) that have partially or completely failed and one or more compute resources (e.g., device controller 142) that remain at least partially functioning (e.g., able to perform at least some of their intended functions). The one or more storage devices in the P2P storage system other than the failed storage device may be referred to as "functioning storage devices."

Figure 4:
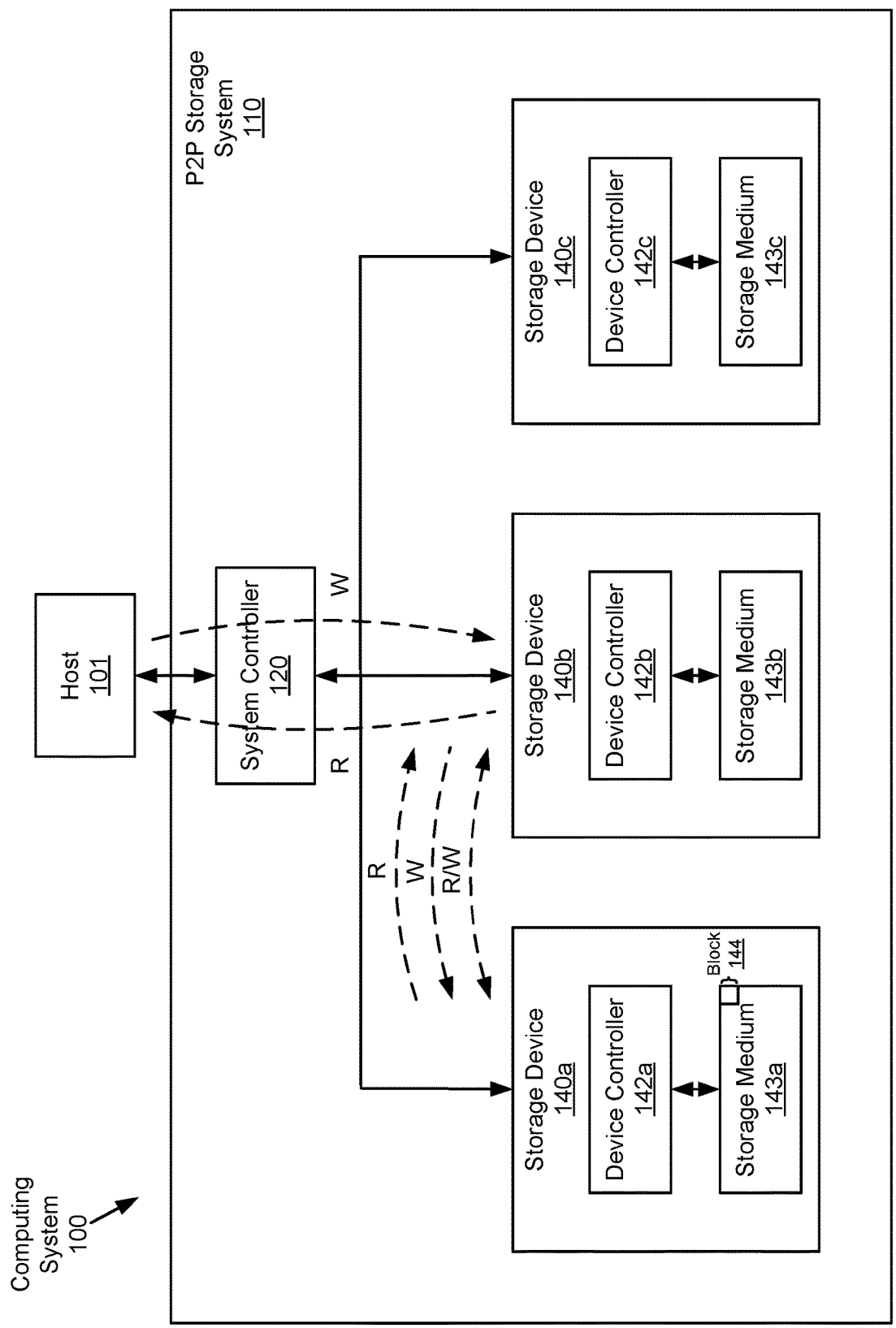
FIG. 4 illustrates various host and P2P data transfers that may occur in connection with a method for using a failed storage device in the P2P storage system shown in FIG. 1 to perform a storage-centric task, in accordance with an embodiment.

In the P2P storage system 110 shown in FIGS. 1 and 4, the storage device 140b corresponds to the failed storage device (henceforth to be referred to as failed storage device 140') and one or more of the storage devices 140a and 140c correspond to the functioning storage device(s) (henceforth to be referred to as functioning storage device 140"). However, it should be noted that in other embodiments of the P2P storage system, other storage devices may correspond to the failed storage device and to the functioning storage device(s).

In embodiments in which the storage resources (e.g., storage medium 143) of the failed storage device have failed (e.g., are no longer functioning), the otherwise idle compute resources of the failed storage device may be used to perform storage-centric tasks as described below with reference to FIGS. 5-6. As noted earlier, this is in contrast to conventional systems in which the failed storage device is no longer used after a failure is detected.

Figure 2:
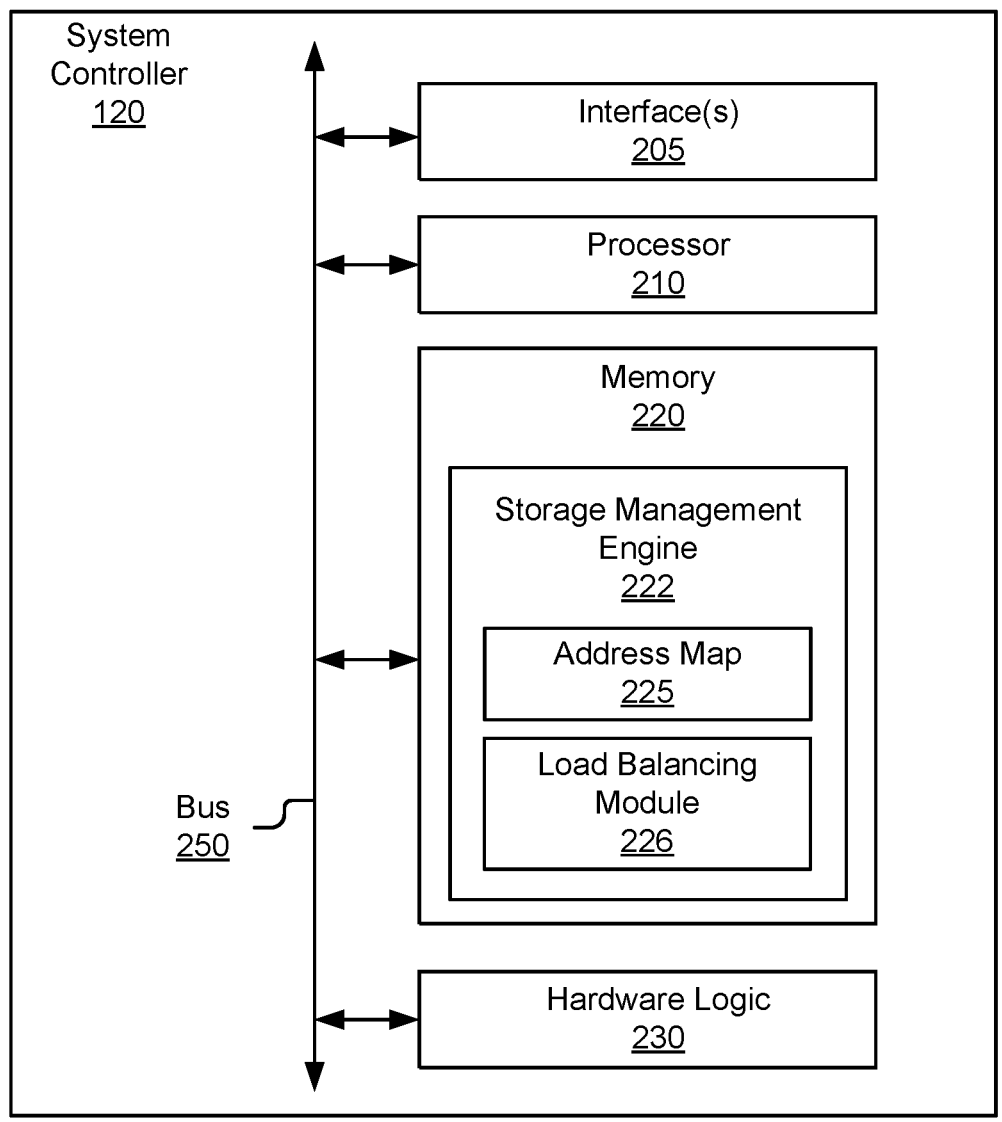
FIG. 2 depicts a block diagram of an example system controller for the P2P storage system shown in FIG. 1, in accordance with an embodiment.

FIG. 2 depicts a block diagram of an example system controller 120 for the P2P storage system 110 shown in FIG. 1, in accordance with an embodiment. The system controller 120 may be used to manage the operation of and provide an external interface to (e.g., for communication with the host 101) the storage devices 140a, 140b, and 140c. As noted earlier, in some embodiments, the system controller 120 may coordinate its actions with the actions of the other components in the computer system 100, such as the host 101 and/or the storage devices 140a, 140b, and 140c, in performing the various storage-centric tasks as described below, using, for example, the distributed global FTL data management scheme as described below with reference to FIG. 7.

As shown in FIG. 2, the system controller 120 may comprise, among other components, one or more interface(s) 205, a processor 210, a memory 220 containing software, firmware and/or data including, but not limited to, a storage management engine 222. A bus 250 may be used to communicatively couple the various components of the system controller 120. It should be understood that the system controller 120 may include alternative, additional and/or fewer components depending on the configuration, such as configurations combining elements, implementing elements in hardware vs. software, etc.

The one or more interface(s) 205 may communicatively couple the system controller 120 to the host 101 and/or the storage devices 140a, 140b, and 140c. The one or more interface(s) 205 may include, but are not limited to, input/output (I/O) interface circuitry that uses appropriate communications protocol(s) for communicating with the host 101 and/or the storage devices 140a, 140b, and 140c.

The processor 210, which may include one or more processing units, may be used to execute the instructions of various software programs contained in the memory 220. The processor 210 may include one or more processing units and/or cores, programmable integrated circuits such as application-specific integrated circuits (ASICs) or field-programmable gate arrays (FPGAs), or some combination thereof. The processor 210 may be based on various computing architectures including a complex instruction set computer (CISC) architecture, a reduced instruction set computer (RISC) architecture, or an architecture implementing a combination of instruction sets. It should be understood that other configurations of the processor 210 are possible.

The memory 220, which may include one or more non-transitory storage devices, may store software programs, firmware and/or data that are executed or otherwise processed by the processor 210. The memory 220 may comprise, for example, volatile memory such as dynamic random-access memory (DRAM) device(s), static random-access memory (SRAM) device(s), non-volatile memory such as electrically erasable programmable read-only memory (EEPROM) or flash memory devices, a combination of the foregoing, and/or some other suitable type of data storage medium.

The storage management engine 222 contained in memory 220 may include routines and/or instructions that when executed by the processor 210 may perform one or more of the various memory management operations for the storage devices 140a, 140b, and 140c, including operations relating to address translation, data recovery and reconstruction, garbage collection and/or load balancing.

In some embodiments, the storage management engine 222 may include an address map 225 and a load balancing module 226. The address map 225 may contain address information used by the storage management engine 222 to translate logical addresses or name spaces received in connection with read or write requests received from the host 101 into physical addresses for accessing storage devices in the P2P storage system 110

The load balancing module 226 may implement a load balancing policy for the P2P storage system 110. In some embodiments, the load balancing module 226 may perform functions including monitoring the load of the storage devices in the P2P storage system and assigning and managing tasks received from the host 101 and to be performed by one or more of the storage devices in the P2P storage system 110 based on the measured loads. These load balancing functions will be described in more detail below with reference to FIGS. 5-6.

In some embodiments, one or more hardware logic module(s) 230, such as ASICs, FPGAs, etc., may be employed in place of, or as a supplement to, the software and/or firmware in the memory 220 to perform one or more of the aforementioned functions provided by the storage management engine 222.

Figure 3:
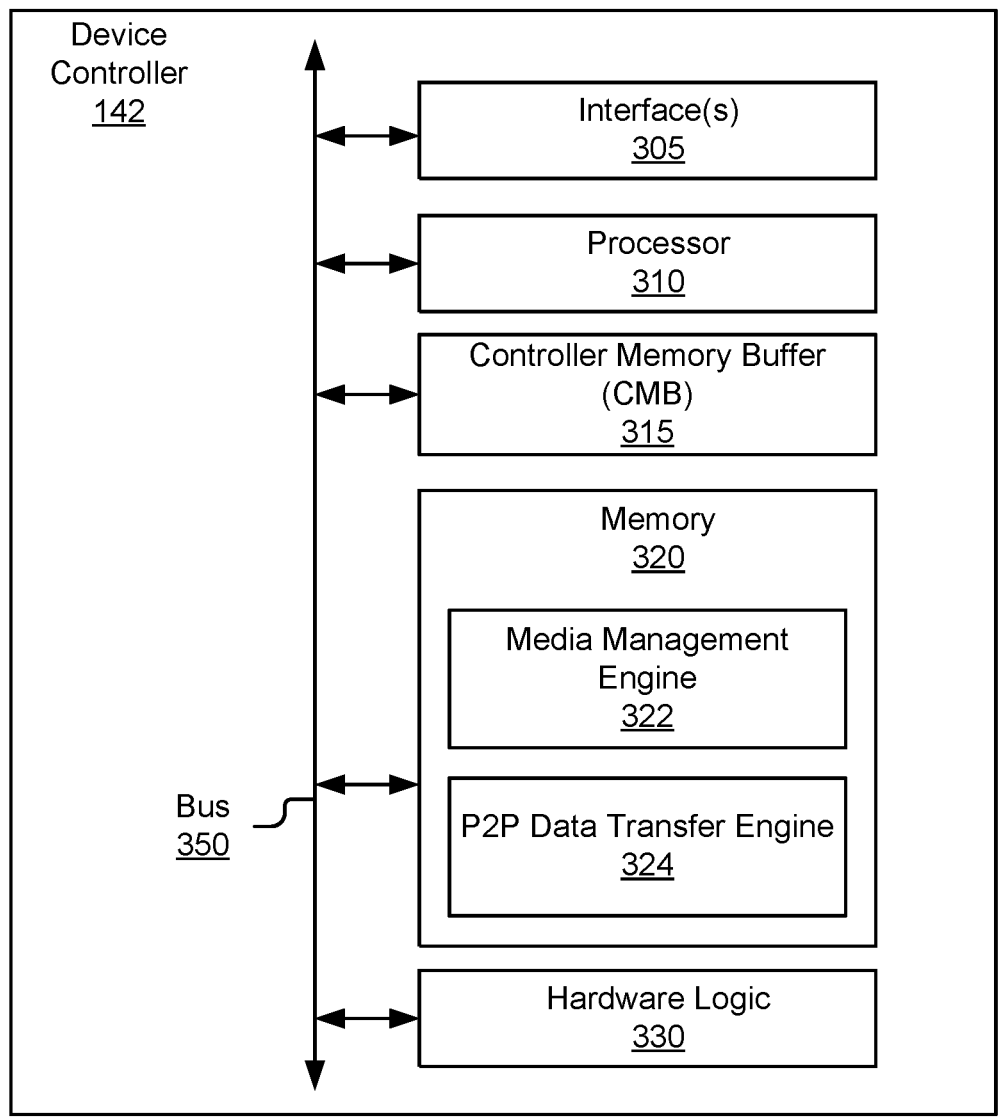
FIG. 3 depicts a block diagram of an example device controller for the P2P storage system shown in FIG. 1, in accordance with an embodiment.

FIG. 3 depicts a block diagram of an example device controller 142 for the P2P storage system 110 shown in FIG. 1, in accordance with an embodiment. As noted earlier, the device controller 142 may be used to manage the operation of and provide an external interface to the respective storage device 140.

As shown in FIG. 3, the device controller 142 may comprise, among other components, one or more interface(s) 305, a processor 310, a controller memory buffer (CMB) 315, a memory 320 containing software, firmware and/or data including a media management engine 322, and a P2P data transfer engine 324. A bus 350 may be used to communicatively couple the various components of the device controller 142. It should be understood that the device controller 142 may include alternative, additional and/or fewer components depending on the configuration, such as configurations combining elements, implementing elements in hardware vs. software, etc.

The one or more interface(s) 305 may communicatively couple the device controller 142 to the system controller 120 and/or the other storage devices in the P2P storage system 110. The one or more interface(s) 305 may include, but are not limited to, I/O interface circuitry that uses appropriate communications protocol(s) (e.g., Ethernet, InfiniBand, PCIe, etc.) for communicating with the system controller 120 and/or the other storage devices.

The processor 310, which may include one or more processing units, may be used to execute the instructions of various software programs contained in the memory 320. The processor 310 may include one or more processing units and/or cores, programmable integrated circuits such as application-specific integrated circuits (ASICs) or field-programmable gate arrays (FPGAs), or some combination thereof. The processor 310 may be based on various computing architectures including a complex instruction set computer (CISC) architecture, a reduced instruction set computer (RISC) architecture, or an architecture implementing a combination of instruction sets. It should be understood that other configurations of the processor 310 are possible.

The CMB 315 may include one or more memory buffers that are used to temporarily store source or destination data involved in P2P read or write data transfers. In some embodiments, the CMB 315 may be accessible directly from outside of the storage device for performing direct memory access (DMA) operations with another storage device in the P2P storage system 110.

The memory 320, which may include one or more non-transitory storage devices, may store software programs, firmware and/or data that are executed or otherwise processed by the processor 310. The memory 320 may comprise, for example, volatile memory such as dynamic random-access memory (DRAM) device(s), static random-access memory (SRAM) device(s), non-volatile memory such as electrically erasable programmable read-only (EEPROM) or flash memory devices, a combination of the foregoing, and/or some other suitable type of data storage medium.

The media management engine 322 contained in memory 320 may include routines and/or instructions that when executed by the processor 310 may perform one or more of the various memory management operations for the storage medium 143, including operations relating to data recovery and reconstruction and device-level garbage collection.

The P2P data transfer engine 324 contained in memory 320 may include routines and/or instructions that when executed by the processor 310 may perform one or more actions for conducting P2P communications (e.g., P2P data transfers) with other storage devices in the P2P storage system 110, such as translating logical addresses associated with P2P commands, issuing and executing P2P commands and data transfers, as described below with reference to FIG. 4. The P2P data transfer engine 324 can perform the P2P data transfers in various ways. For example, in some embodiments, the P2P data transfer engine 324 may operate in full initiator mode, which enables a storage device to connect, to create commands, and to send the commands to other storage devices. In some other embodiments, the host 101 may set up shared memory areas in each storage device 140, send one or more commands to a source storage device to read data in the source storage device to a shared memory area, and then initiate the sending of data from the shared memory area to a target storage device using DMA.

In some embodiments, one or more hardware logic module(s) 330, such as ASICs, FPGAs, etc., may be employed in place of, or as a supplement to, the software and/or firmware in the memory 320 to perform one or more of the aforementioned functions provided by the media management engine 322 and/or P2P data transfer engine 324.

FIG. 4 illustrates various host and P2P data transfers that may occur in connection with the method for using the failed storage device 140' (e.g., storage device 140b) in the P2P storage system 110 shown in FIG. 1 to perform a storage-centric task (as described below with reference to FIGS. 5-6), in accordance with an embodiment. As noted earlier, in the P2P storage system 110 shown in FIGS. 1 and 4, the storage device 140b corresponds to the failed storage device 140' and one or more of the storage devices 140a and 140c correspond to the functioning storage device 140". However, it should be noted that in other embodiments of the P2P storage system, other storage devices may correspond to the failed storage device and to the functioning storage device(s).

As shown in FIG. 4, in some embodiments the types of data transfers that may occur between the host 101 and the storage devices 140a, 140b, and 140c in the P2P storage system 110 (described from the perspective of the host 101) include: (1) a read data transfer (indicated by the dashed arrow labeled "R") and (2) a write data transfer (indicated by the dashed arrow labeled "W"). In some embodiments, these data transfers may be initiated by the issuance of one or more NVMe read commands or write commands by the system controller 120 as appropriate. In some embodiments, these data transfers may be performed by the host 101 in coordination with the storage management engine 222 in the system controller 120.

As shown in FIG. 4, in some embodiments the types of P2P data transfers that may occur between storage devices in the P2P storage system 110 (described from the perspective of the failed storage device 140') include: (1) a read data transfer (indicated by the dashed arrow labeled "R"), (2) a write data transfer (indicated by the dashed arrow labeled "W"), and (3) a read/write data transfer (indicated by the dashed arrow labeled "R/W"). In the illustrated example, the P2P data transfers are shown as occurring between storage devices 140a and 140b, but more generally the P2P data transfers may occur between any two storage devices in the P2P storage system 110. In some embodiments, these P2P data transfers may be initiated by the issuance of one or more P2P read commands or write commands by the initiator device to the target device as appropriate. In some embodiments, these P2P data transfers may be performed by the P2P data transfer engine 324 in coordination with the CMB 315 of the device controller 142 of the corresponding storage devices in the P2P storage system 110.

For the P2P data transfers shown in the example of FIG. 4, the failed storage device 140' corresponds to the initiator device and the functioning storage device 140" corresponds to the target device. However, in other instances the initiator device and the target device may differ depending on the particular transaction being performed.

Figure 5A:
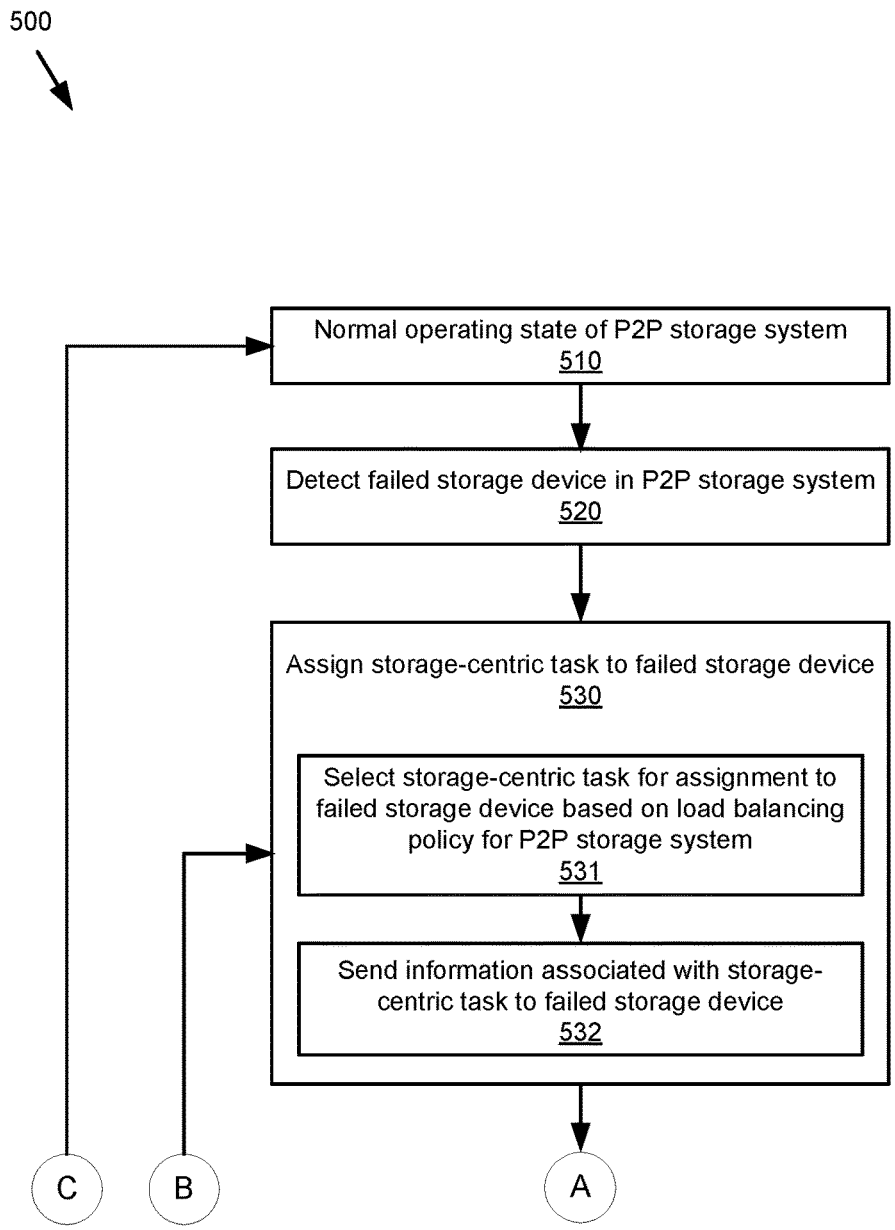
FIGS. 5A and 5B depict a flow diagram of an example method for using a failed storage device in the P2P storage system shown in FIGS. 1 and 4 to perform a storage-centric task, in accordance with an embodiment.
Figure 5B:
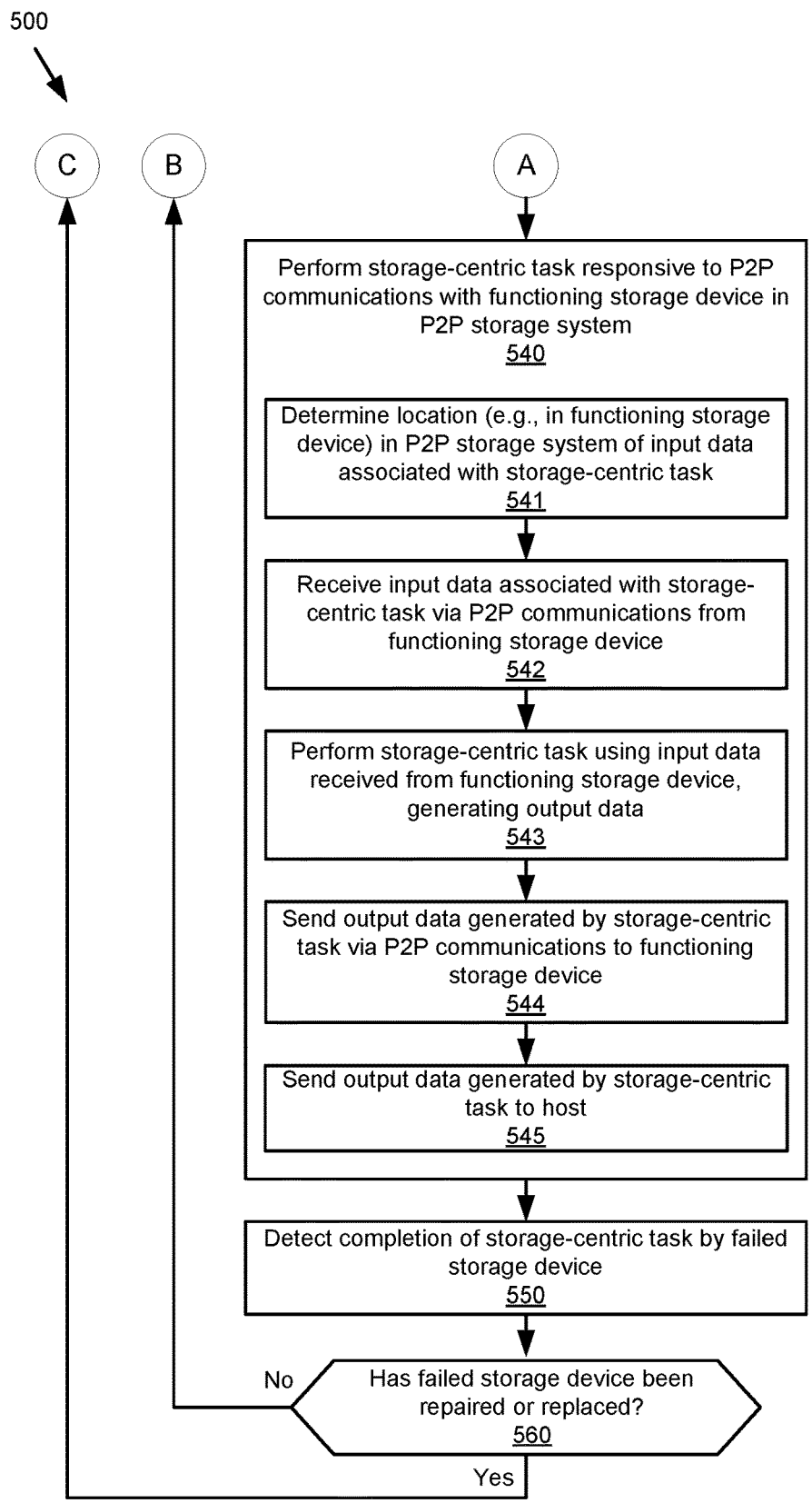

FIGS. 5A and 5B depict a flow diagram of an example method 500 for using the failed storage device 140' in the P2P storage system 110 shown in FIGS. 1 and 4 to perform a storage-centric task, in accordance with an embodiment. In some embodiments, one or more of the blocks in the method 500 may be performed in accordance with the distributed global FTL data management scheme as described below with reference to FIG. 7.

As previously noted, in the present disclosure, a "storage-centric task" may refer to any sequence of operations (e.g., a "job", a "process", etc.) that involve the transfer and/or processing of data stored in storage devices or systems (e.g., P2P storage system 110). The storage-centric task may originate from the host 101 (in connection with the execution an application by the host) or in some cases, be transferred from a functioning storage device 140" in the P2P storage system 110. Examples of storage-centric tasks include pattern matching, map/reduce, compression/decompression, encryption/decryption, failed storage device rebuild, etc. In some embodiments, the storage-centric task may be a "new" task that has not been previously performed by the failed storage device 140' prior to the failure of the failed storage device. In some embodiments, the storage-centric task may be defined by a series of computer-executable instructions and addresses of input data and/or output data. In some embodiments, the computer-executable instructions may comprise program code executable by the functioning compute resource (e.g., device controller 142) in the failed storage device 140'.

In block 510, the P2P storage system 110 may be in a normal operating state, in which the storage devices in the P2P storage system 110 are properly functioning and tasks may be assigned to and performed by one or more of the storage devices according to a load balancing policy. The load balancing policy used by the P2P storage system 110 may be static or dynamic and may be based on one or more load balancing schemes such as round robin, "balanced load", etc. In some embodiments, the "balanced load" policy may simply attempt to balance the processing and/or I/O load among the storage devices in the P2P storage system 110, based on factors such as the number of tasks being performed, the latency, and/or the throughput of each storage device. Depending on the embodiment, the load balancing policy used during the normal operating state of the P2P storage system 110 in block 510 may be the same as, or different from, the load balancing policy used to select and assign the storage-centric task, as discussed in block 531 below.

In block 520, the system controller 120 detects the failed storage device 140' in the P2P storage system 110. In some embodiments, the system controller 120 may detect the failed storage device 140' in coordination with the failed storage device through the use of one or more NVMe commands. As described earlier, the failed storage device 140' may refer to any storage device in the P2P storage system that is not properly functioning in any respect, including a storage device that is still operational but may be deemed "failed" based on an early warning indication. In some embodiments, the failed storage device 140' may include one or more compute resources (e.g., device controller 142) and/or storage resources (e.g., storage medium 143) that remain at least partially functioning, e.g., able to perform at least some of their intended function(s).

In block 530, the system controller 120 assigns a storage-centric task to the failed storage device 140'. In some embodiments, the block 530 may be performed by the load balancing module 226 in the system controller 120. Block 530 includes blocks 531-532, which are described next.

In block 531, the system controller 120 selects a storage-centric task for assignment to the failed storage device 140' based on the load balancing policy for the P2P storage system 110. Depending on the embodiment, the load balancing policy used to select and assign the storage-centric task (in block 531) may be the same as, or different from, the load balancing policy used during the normal operating state of the P2P storage system 110 (in block 510). In some embodiments, the detection of the failed storage device may cause a change (e.g., an increase) in a weighting or bias of the load balancing policy towards assigning a storage-centric task to the failed storage device 140' as compared with the normal operating state of the P2P storage system 110. As noted earlier, this feature may result in improved system performance and/or resource utilization through the continued use of the failed storage device 140' after the device's failure by employing the otherwise idle compute resources of the failed storage device to perform storage-centric tasks.

In block 532, the system controller 120 sends information (e.g., one or more instructions and input and/or output data addresses) associated with the storage-centric task to the failed storage device 140'. In some embodiments, the storage management engine 222 in the system controller 120 may send the information associated with the storage-centric task by issuing a series of NVMe write commands (as described above with reference to FIG. 4) containing the information associated with the storage-centric task to the failed storage device 140'. In this manner, the failed storage device 140' is provided with the information necessary to perform the storage-centric task in block 540.

In block 540, upon determining that the storage-centric task has been assigned to the failed storage device 140', the failed storage device performs the storage-centric task responsive to P2P communications with the functioning storage device 140". In some embodiments, the storage-centric task may be performed by a functioning compute resource (e.g., device controller 142) in the failed storage device 140'. Block 540 includes blocks 541-545, which are described next.

In the embodiment of FIGS. 5A and 5B, the input data and output data associated with the storage-centric task are both located on the functioning storage device 140". However, in other embodiments, the input data and output data may be located on different functioning storage devices in the P2P storage system 110, such as storage devices 140a and 140c, respectively. In the P2P communications described for the illustrated embodiment, the failed storage device 140' corresponds to the initiator device and the functioning storage device 140" corresponds to the target device.

In block 541, the failed storage device 140' determines a location (e.g., in functioning storage device 140") in the P2P storage system 110 of the input data associated with the storage-centric task. In some embodiments, the location of the input data may be determined from the input data address(es) associated with the storage-centric task received from the system controller 120 (e.g., in block 532). In some embodiments, the location of the input data may be determined by performing an address translation operation using the P2P data transfer engine 324 in the failed storage device 140'.

In block 542, the failed storage device 140' receives the input data associated with the storage-centric task via P2P communications with the functioning storage device 140". In some embodiments, the P2P communications may comprise a series of one or more P2P read commands (as described above with reference to FIG. 4) issued by the failed storage device 140' to the functioning storage device 140". In some embodiments, the P2P read commands may be performed by the P2P data transfer engine 324 in coordination with the CMB 315 of the device controller 142 of the corresponding storage devices.

In block 543, the failed storage device 140' performs the storage-centric task using the input data received from the functioning storage device 140", generating output data based on the performing of the storage-centric task. In some embodiments, the storage-centric task may be performed using the functioning compute resource (e.g., device controller 142) in the failed storage device 140' based on the one or more instructions associated with the storage-centric task received from the system controller 120 (e.g., in block 532). The failed storage device 140' may perform the storage-centric task on the blocks 144 of the input data individually as they are received or on the entire set of the input data all at once (e.g., using DMA). In some embodiments, the output data may be temporarily stored in a buffer (e.g., CMB 315) in the failed storage device 140'.

Although blocks 542 and 543 are shown separately in the figure, it should be noted that in some embodiments, at least some the operations in these blocks may be performed concurrently by the failed storage device 140' in performing the storage-centric task.

In block 544, the failed storage device 140' sends the output data generated by the storage-centric task via P2P communications with the functioning storage device 140". In some embodiments, the P2P communications may comprise a series of one or more P2P write commands (as described above with reference to FIG. 4) issued by the failed storage device 140' to the functioning storage device 140". In some embodiments, the P2P write commands may be performed by the P2P data transfer engine 324 in coordination with the CMB 315 of the device controller 142 of the corresponding storage devices. In some embodiments, a location of the output data in the functioning storage device 140" may be determined from the output data address(es) associated with the storage-centric task received from the system controller 120 (e.g., in block 532). In some embodiments, the location of the output data may be determined by performing an address translation operation using the P2P data transfer engine 324 in the failed storage device 140' (as described above in block 541).

In block 545, the functioning storage device 140" sends the output data generated by the storage-centric task to the host 101, from which the task originated. In some embodiments, block 545 may be performed by the functioning storage device 140" in coordination with the system controller 120 through the use of one or more NVMe commands.

In block 550, the system controller 120 detects a completion of the storage-centric task by the failed storage device 140'. In some embodiments, the system controller 120 may detect the completion of the storage-centric task by issuing one or more NVMe commands to the failed storage device 140'.

In block 560, the system controller 120 determines if the failed storage device 140' has been repaired or replaced in the P2P storage system 110. If this is the case, the system controller 120 returns control to block 510 (e.g., normal operation of the P2P storage system 110). If this is not the case, however, the system controller returns control to block 530, in which the system controller assigns another storage-centric task to the failed storage device 140'.

Figure 6A:
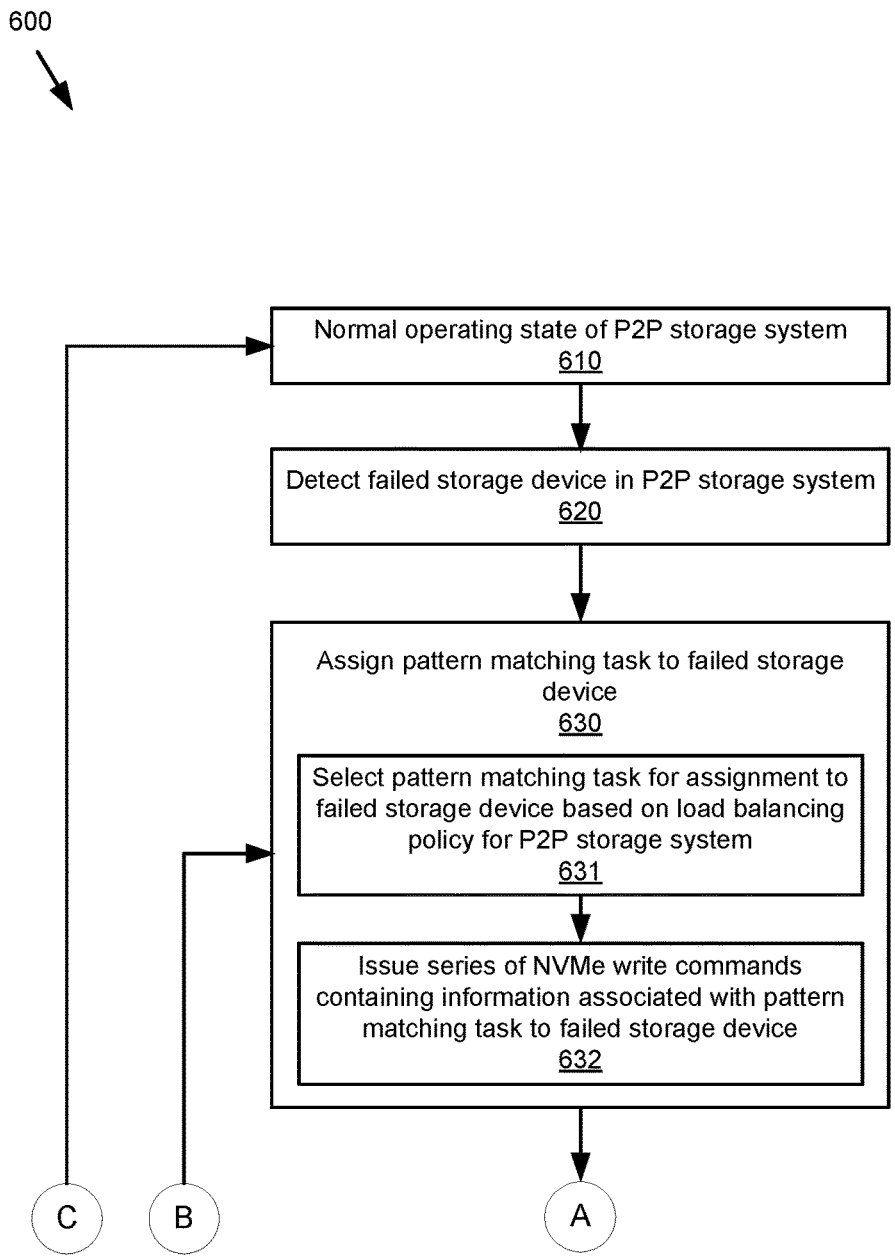
FIGS. 6A and 6B depict a flow diagram of an example method for using a failed storage device in the P2P storage system shown in FIGS. 1 and 4 to perform an exemplary storage-centric task (specifically, a pattern matching task), in accordance with an embodiment.
Figure 6B:
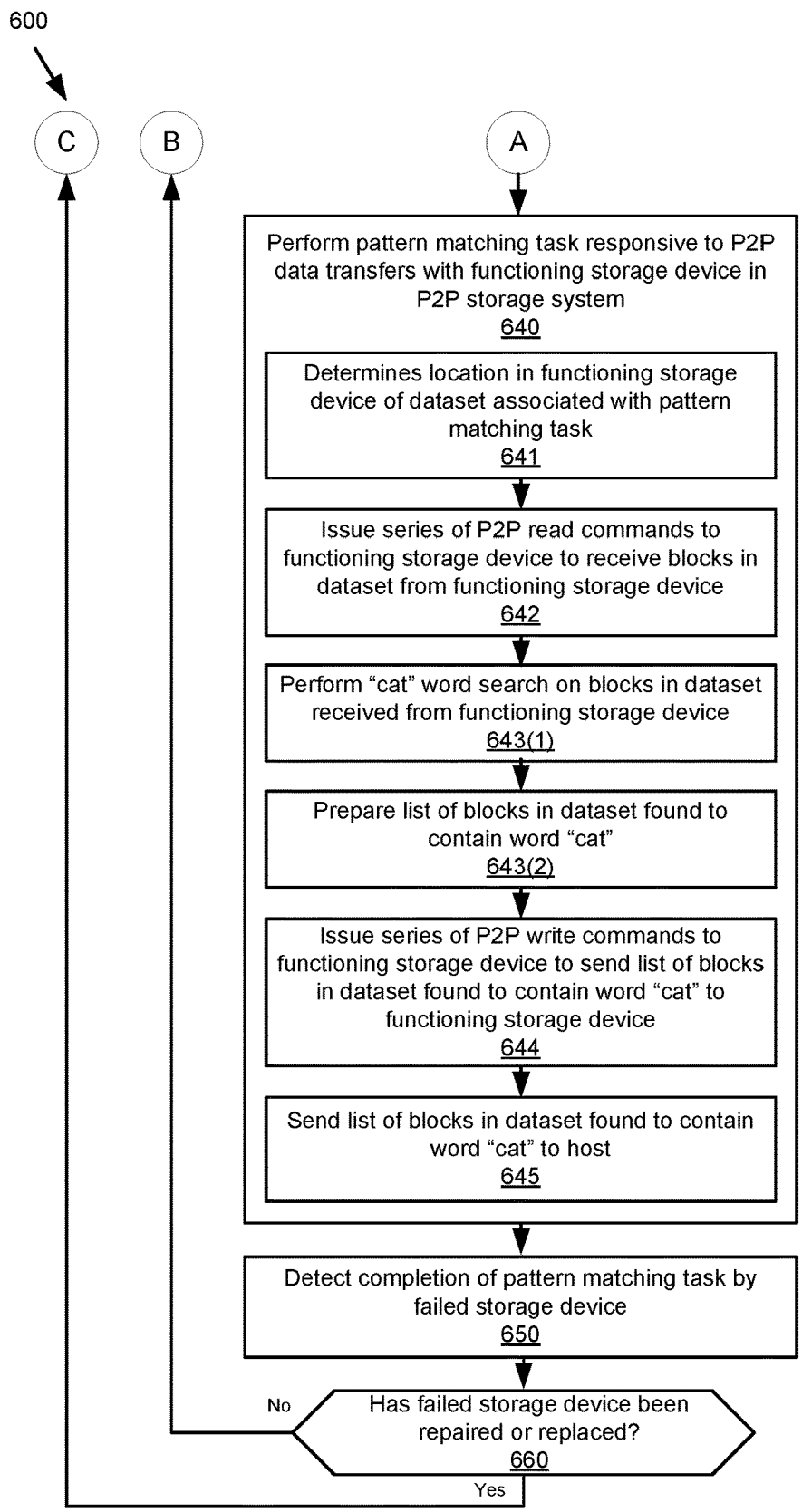

FIGS. 6A and 6B depict a flow diagram of an example method 600 for using the failed storage device 140' in the P2P storage system 110 shown in FIGS. 1 and 4 to perform an exemplary storage-centric task (specifically, a pattern matching task), in accordance with an embodiment. The pattern matching task may comprise a sequence of operations originating from the host 101 that counts all occurrences of the word "cat" in an encrypted compressed dataset stored on the functioning storage device 140". In some embodiments, one or more of the blocks in the method 600 may be performed in accordance with the distributed global FTL data management scheme as described below with reference to FIG. 7. It should be noted that the method 600 is an embodiment of the method 500 described above with reference to FIGS. 5A and 5B, as applied specifically to the pattern matching task.

In block 610, the P2P storage system 110 may be in a normal operating state, in which the storage devices in the P2P storage system 110 are properly functioning and tasks may be assigned to and performed by one or more of the storage devices according to a load balancing policy. In some embodiments, the load balancing policy may be as described above with reference to blocks 510 and 531 in FIGS. 5A and 5B.

In block 620, the system controller 120 detects the failed storage device 140' in the P2P storage system 110. In some embodiments, the system controller 120 may detect the failed storage device 140' as described above with reference to block 520 in FIGS. 5A and 5B.

In block 630, the system controller 120 assigns the pattern matching task to the failed storage device 140'. Block 630 includes blocks 631-632, which are described next.

In block 631, the system controller 120 selects the pattern matching task for assignment to the failed storage device 140' based on the load balancing policy for the P2P storage system 110 described in block 610. Normally, the system controller 120 would assign the pattern matching task to the functioning storage device 140" because that is where the dataset associated with the pattern matching task is stored. Instead, however, the system controller 120 assigns the pattern matching task to the failed storage device 140' because it determines that the functioning storage device 140" is sufficiently busy performing other tasks and the functioning compute resource in the failed storage device 140' is idle, and thus the data decryption/decompression associated with the pattern matching task would be performed more quickly by the failed storage device 140'.

In block 632, the system controller 120 issues a series of NVMe write commands (as described above with reference to FIG. 4) containing information (e.g., one or more instructions and input and/or output data addresses) associated with the pattern matching task to the failed storage device 140'. In this manner, the failed storage device 140' is provided with the information necessary to perform the storage-centric task in block 640.

In block 640, the failed storage device 140' performs the pattern matching task responsive to P2P communications with the functioning storage device 140", in which the dataset associated with the pattern matching task is stored. Block 640 includes blocks 641-645, which are described next.

In block 641, the failed storage device 140' determines a location in the functioning storage device 140" of the dataset associated with the pattern matching task.

In block 642, the failed storage device 140' issues a series of one or more P2P read commands (as described above with reference to FIG. 4) to the functioning storage device 140" to receive one or more blocks 144 in the dataset from the functioning storage device.

In block 643(1), the failed storage device 140' begins performing the pattern matching task by performing a "cat" word search on the one or more blocks 144 in the dataset received from the functioning storage device 140". In some embodiments, block 643(1) may first involve decrypting and/or decompressing the blocks in the dataset. In some embodiments, the pattern matching task may be performed using the functioning compute resource (e.g., device controller 142) in the failed storage device 140' based on the one or more instructions associated with the pattern matching task received from the system controller 120 (e.g., in block 632). The failed storage device 140' may perform the pattern matching task on the blocks of the dataset individually as they are received or on the entire set of blocks all at once (e.g., using DMA). In some embodiments, the output data may be temporarily stored in a buffer (e.g., CMB 315) in the failed storage device 140'.

In block 643(2), the failed storage device 140' prepares a list of blocks in the dataset found to contain the word "cat."

Although blocks 642, 643(1), and 643(2) are shown separately in the figure, it should be noted that in some embodiments, at least some of the operations in these blocks may be performed concurrently by the failed storage device 140' in performing the pattern matching task.

In block 644, the failed storage device 140' issues a series of one or more P2P write commands to the functioning storage device 140" to send the list of blocks 144 in the dataset that were found to contain the word "cat" to the functioning storage device.

In block 645, the functioning storage device 140" sends the list of blocks 144 in the dataset found to contain the word "cat" to the host 101, from which the task originated. In some embodiments, block 645 may be performed by the functioning storage device 140" in coordination with the system controller 120 using one or more NVMe commands.

In block 650, the system controller 120 detects a completion of the pattern matching task by the failed storage device 140'. In some embodiments, the system controller 120 may detect the completion of the storage-centric task by issuing one or more NVMe commands to the failed storage device 140'.

In block 660, the system controller 120 determines if the failed storage device 140' has been repaired or replaced in the P2P storage system 110. If this is the case, the system controller 120 returns control to block 510 (e.g., normal operation of the P2P storage system 110). If this is not the case, however, the system controller returns control to block 530, in which the system controller 120 assigns another storage-centric task to the failed storage device 140'.

Figure 7:
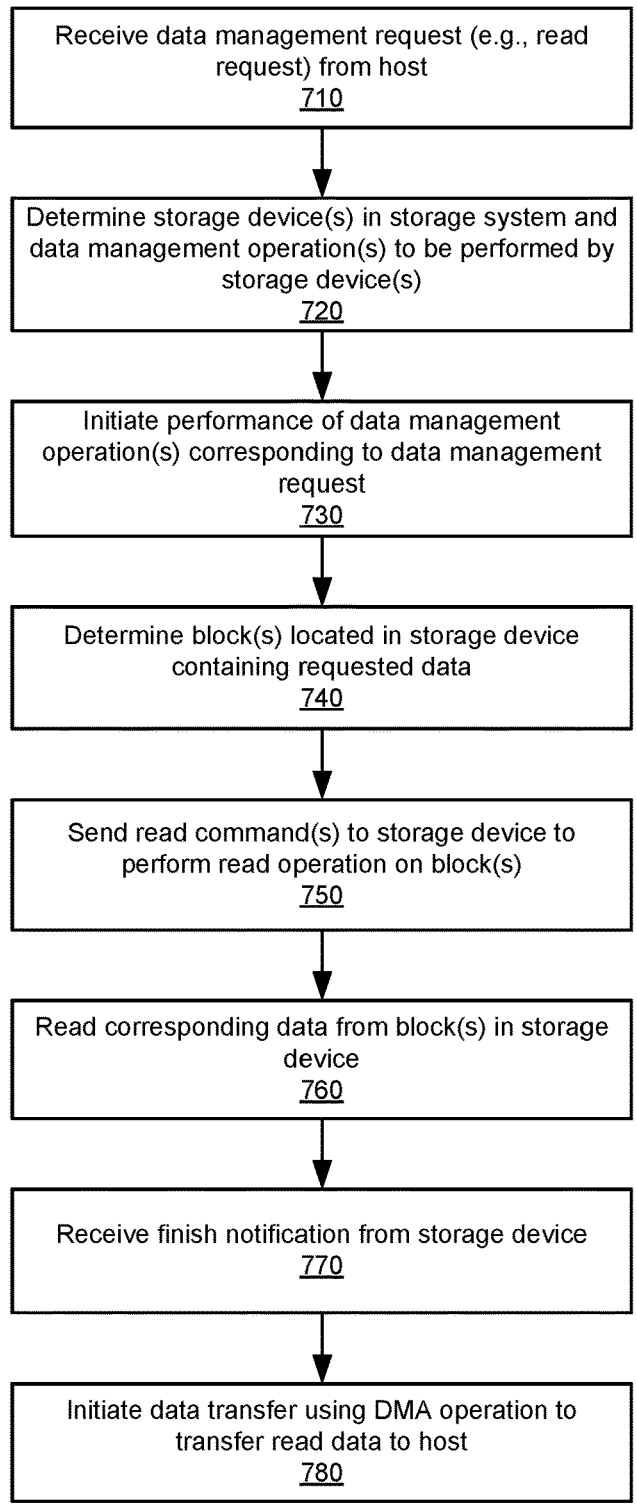
FIG. 7 depicts a flow diagram of an example method for performing a data management request (e.g., data transfer request) in accordance with a distributed global flash translation layer (FTL) data management scheme for the computing system shown in FIGS. 1 and 4, in accordance with an embodiment.

FIG. 7 depicts a flow diagram of an example method 700 for performing a data management request (e.g., data transfer request) in accordance with a distributed global flash translation layer (FTL) data management scheme for the computing system 100 shown in FIG. 1, in accordance with an embodiment. In the example shown in FIG. 7, most of the blocks in the method 700 are performed by the system controller 120, although in other embodiments one or more of the blocks in the method may be performed by other devices (e.g., host 101 or storage device 140) in the storage system 110.

In block 710, the system controller 120 may receive a data management request (e.g., read request) from the host 101.

In block 720, the system controller 120 may determine (e.g., using the storage management engine 222), based on the data management request, one or more storage devices 140 in the storage system 110 and one or more data management operations to be performed by the one or more storage devices 140. In some embodiments, the system controller 120, in order to determine the one or more storage devices 140, receives an input logical address from the host 101 and indexes the address map 225, which maps logical addresses to storage devices, using the input logical address to identify the one or more storage devices 140. In some such embodiments, the system controller 120 uses at least a portion of the input logical address to identify the one or more storage devices 140.

In block 730, the system controller 120 may initiate performance of data management operation(s) corresponding to the data management request. In some embodiments, block 730 includes sending one or more data management commands to the one or more storage devices 140 and initiating one or more data transfers (either before or after sending the one or more data management commands). The one or more data transfers may include one or more operations such as a direct memory access (DMA) operation to transfer data between a memory buffer of a respective storage device 140 in the storage system 110 and a memory buffer of the host 101, and/or an internal data transfer between two or more of the storage devices 140 in the storage system 110. In some embodiments, the one or more data transfers includes a DMA operation to transfer data between a memory buffer of a respective storage device 140 in the storage system 110 and a memory buffer of the host 101, and/or an internal data transfer between two or more of the storage devices 140 in the storage system 110.

In block 740, in the case of a read request the system controller 120 determines, based on the address map 225, a set of blocks located in a respective storage device 140 in the storage system 110 containing the requested data. In some embodiments, the address map 225 maps one or more global logical addresses, identified by the read request (received from the host 101), to one or more storage devices 140 in the P2P storage system 110, and optionally to one or more local logical addresses in each such storage device. The local logical addresses are mapped, by the respective storage device 140, to physical addresses in the storage device using logical-to-physical mapping mechanisms in the storage device. In some embodiments, the system controller 120 initiates the computation of the address map 225. In some embodiments, the address map is computed by one or more devices external to the system controller 120. In some embodiments, the address map 225 is stored/located in the respective storage device 140.

In block 750, the system controller 120 sends one or more read commands to the respective storage device 140 to perform the read operation on the set of blocks. In some embodiments, the system controller 120 translates the read request received from the host 101 into the one or more read commands, using a predefined command translation process.

In block 760, the device controller 142 of the respective storage device 140 responds to the one or more read commands by reading the corresponding data from the set of blocks in the respective storage device.

In block 770, the system controller 120 receives a finish notification from the respective storage device 140 that indicates the execution of the read command sent to the respective storage device is complete, and that the resulting read data is stored in a memory buffer of the device controller 142 of the respective storage device.

In block 780, the system controller 120, after receiving the finish notification, initiates a data transfer using a DMA operation to transfer (e.g., send) the read data to the host 101 that sent the read request. In some embodiments, block 780 includes the system controller 120 sending a data transfer command to a respective network interface controller (not shown) in the storage system 110 to transfer the read data from a memory buffer of the system controller 120 to a memory buffer of the host 101, using DMA or remote direct memory access (RDMA) to transfer the read data.

Methods and systems for using a failed storage device in a P2P storage system to perform a storage-centric task are described above. Technical features and advantages of one or more embodiments of the present disclosure as described above may include, but are not limited to, one or more of the following:

(1) Improved system performance in the event of a failure of a storage device in the storage system. The present disclosure improves system performance by assigning storage-centric tasks to, rather than away from (per conventional systems), the failed storage device upon detecting the failure. The failed storage device can perform tasks more efficiently than another, still functioning storage device in the storage system because the failed storage device no longer has a regular input/output (I/O) load (e.g., compression/decompression or encryption/decryption, which are very computation intensive) due to the failure of its storage medium.

(2) Improved system resource utilization in the event of a failure of a storage device in the storage system. The present disclosure improves system resource utilization through the continued use of the failed storage device after the device's failure by employing the otherwise idle compute resources of the failed storage device to perform storage-centric tasks. The present disclosure takes advantage of the fact that despite a failure in its storage medium, other compute, storage, and/or I/O resources of the failed storage device may remain operational.

Methods and systems for using a failed storage device in a P2P storage system to perform a storage-centric task are described above. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment" or "an embodiment" means that a particular feature, structure, or characteristic described in connection with the embodiment is included in at least one embodiment or implementation of the disclosed technologies. The appearances of the phrase "in one embodiment" in various places in the specification are not necessarily all referring to the same embodiment or implementation.

Some portions of the detailed descriptions above may be presented in terms of processes and symbolic representations of operations on data bits within a computer memory. A process can generally be considered a self-consistent sequence of operations leading to a result. The operations may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD ROMs, and magnetic disks, read-only memories (ROMs), random access memories (RAMs), erasable programmable read-only memories (EPROMs), electrically erasable programmable read-only memories (EEPROMs), magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terms storage media, storage device, and data blocks are used interchangeably throughout the present disclosure to refer to the physical media upon which the data is stored.

Finally, the processes and displays presented herein may not be inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method, comprising:
   responsive to a detection of a failed storage device in a peer-to-peer (P2P) storage system:
   determining, by the failed storage device, that a storage-centric task is assigned to the failed storage device; and
   performing, by the failed storage device, the storage-centric task responsive to P2P communications with a functioning storage device in the P2P storage system.

2. The computer-implemented method of claim 1, wherein performing the storage-centric task includes:
   receiving input data associated with the storage-centric task via the P2P communications from the functioning storage device; and
   performing the storage-centric task using the input data received from the functioning storage device.

3. The computer-implemented method of claim 1, wherein performing the storage-centric task includes:
   generating output data; and
   sending the output data via the P2P communications to the functioning storage device.

4. The computer-implemented method of claim 1, wherein a functioning compute resource in the failed storage device performs the storage-centric task.

5. The computer-implemented method of claim 1, wherein the P2P communications include at least one of a P2P read command and a P2P write command that are issued by the failed storage device to the functioning storage device.

6. The computer-implemented method of claim 1, wherein:
   the P2P storage system includes a controller; and
   the controller assigns the storage-centric task to the failed storage device based on a load balancing policy for the P2P storage system.

7. The computer-implemented method of claim 6, wherein the detection of the failed storage device causes a change in a weighting of the load balancing policy.

8. The computer-implemented method of claim 1, wherein:
   the storage-centric task comprises a pattern matching task; and
   the failed storage device performs the pattern matching task on a dataset stored on the functioning storage device.

9. An apparatus, comprising:
   one or more processors; and
   logic, executable by the one or more processors, configured to perform operations comprising:
   responsive to a detection of a failed storage device in a peer-to-peer (P2P) storage system:
   determining, by the failed storage device, that a storage-centric task is assigned to the failed storage device; and
   performing, by the failed storage device, the storage-centric task responsive to P2P communications with a functioning storage device in the P2P storage system.

10. The apparatus of claim 9, wherein the performing the storage-centric task includes:
    receiving input data associated with the storage-centric task via the P2P communications from the functioning storage device; and
    performing the storage-centric task using the input data received from the functioning storage device.

11. The apparatus of claim 9, wherein the performing the storage-centric task includes:
   generating output data; and
   sending the output data via the P2P communications to the functioning storage device.

12. The apparatus of claim 9, wherein a functioning compute resource in the failed storage device is configured to perform the storage-centric task.

13. The apparatus of claim 9, wherein the P2P communications include at least one of a P2P read command and a P2P write command that are issued by the failed storage device to the functioning storage device.

14. The apparatus of claim 9, wherein:
   the P2P storage system includes a controller; and
   the controller is configured to assign the storage-centric task to the failed storage device based on a load balancing policy for the P2P storage system.

15. The apparatus of claim 14, wherein the detection of the failed storage device is configured to cause a change in a weighting of the load balancing policy.

16. A computer-implemented method, comprising:
   detecting a failed storage device in a peer-to-peer (P2P) storage system; and
   responsive to detecting the failed storage device:
      assigning a storage-centric task to the failed storage device, the storage-centric task to be performed by the failed storage device responsive to P2P communications with a functioning storage device in the P2P storage system; and
      detecting a completion of the storage-centric task by the failed storage device.

17. The computer-implemented method of claim 16, wherein a functioning compute resource in the failed storage device performs the storage-centric task.

18. The computer-implemented method of claim 16, wherein the P2P communications include at least one of a P2P read command and a P2P write command that are issued by the failed storage device to the functioning storage device.

19. The computer-implemented method of claim 16, wherein:
   the P2P storage system includes a controller; and
   the controller assigns the storage-centric task to the failed storage device based on a load balancing policy for the P2P storage system.

20. A system, comprising:
   means for detecting a failed storage device in a plurality of storage devices;
   means for assigning a storage-centric task to the failed storage device in response to detecting the failed storage device; and
   means for performing the storage-centric task responsive to peer-to-peer (P2P) communications with a functioning storage device in the plurality of storage devices.

* * * * *